United States Patent
Dastin et al.

[11] Patent Number: 5,138,397
[45] Date of Patent: Aug. 11, 1992

[54] PARK POSITION CONTROL APPARATUS FOR A SHEET TRANSPORT SYSTEM

[75] Inventors: Richard M. Dastin, Fairport; Kenneth J. Mihalyov, Webster; Janine M. Gates, Rochester; Rachel C. Kusmierz, Penfield, all of N.Y.

[73] Assignee: Xerox Corporation, Stamford, Conn.

[21] Appl. No.: 755,996

[22] Filed: Sep. 6, 1991

[51] Int. Cl.$^5$ .............................................. G03G 21/00
[52] U.S. Cl. ................................... 355/316; 355/309; 355/271
[58] Field of Search ............... 355/271, 272, 274, 277, 355/309, 316, 317

[56] References Cited

U.S. PATENT DOCUMENTS

| | | | |
|---|---|---|---|
| 4,386,771 | 6/1983 | Lakdawala | 271/82 |
| 4,552,448 | 11/1985 | Davidson | |
| 4,849,795 | 7/1989 | Spehrley et al. | 355/317 |
| 4,872,037 | 10/1989 | Kasahara et al. | 355/271 |
| 4,875,069 | 10/1989 | Takada et al. | 355/271 |
| 4,905,052 | 2/1990 | Cassano et al. | 355/309 X |
| 5,014,123 | 5/1991 | Imoto | 358/75 |
| 5,041,866 | 8/1991 | Imoto | 355/38 |
| 5,045,892 | 9/1991 | Morisawa et al. | 355/309 |
| 5,075,734 | 12/1991 | Durland et al. | 355/309 X |

OTHER PUBLICATIONS

U.S. patent application Ser. No. 07/630,629, "Sheet Transport System with Improved Registration", filed Dec. 20, 1990, Vittorio Castelli et al.

*Primary Examiner*—R. L. Muses
*Attorney, Agent, or Firm*—Kenyon & Kenyon

[57] ABSTRACT

A method and apparatus for assuring proper park positioning of a sheet gripper device. A reference signal is generated by a master control board causing the sheet gripper to commence its movement along the belts of a sheet transport system. An index marker and encoder coupled to a servo motor generate pulses based on the rotation of the shaft of the servo motor. A registration control board coupled to the servo motor generates an index interrupt after receipt of a predetermined number of pulses from the index marker. The number of rising and falling edges of a system clock that occur between the generation of the reference signal and the index interrupt is computed by the registration control board and sent to the master control board. The master control board compares this distance value to a predetermined resynchronization value. Based on the discrepancy between the two values, the master control board recalculates a park position value which is sent to the registration control board. The park position value is the amount of time that elapses after the sheet gripper has passed a gripper home sensor. Thus, recalculation of the park position value insures accurate park positioning prior to the performance of each job.

19 Claims, 2 Drawing Sheets

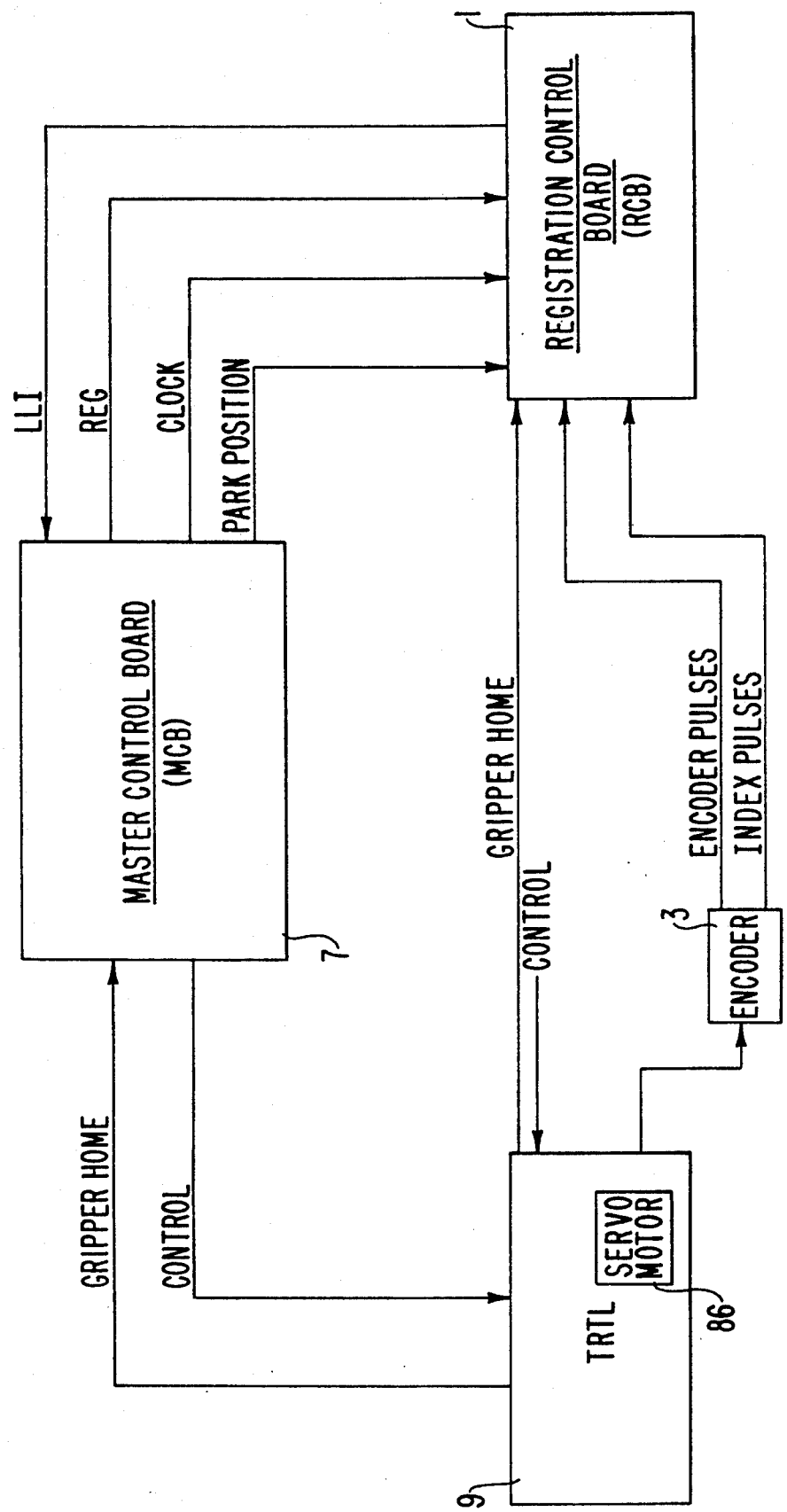

PARK POSITION CONTROL APPARATUS FOR A SHEET TRANSPORT SYSTEM

Background of the Invention

The present invention relates to an improvement in the detection and maintenance of a park position in a sheet transport system, and in particular to a method and apparatus for accurately positioning a sheet gripper in a sheet transport system to a park position by determining an alternate position value in order to compute a park position error value.

In a sheet transport system, a sheet gripper device, or the like, is coupled in close proximity to a belt entrained around a plurality of rollers. The sheet gripper is used to grasp an article such as a sheet of paper. In many applications, it becomes necessary to accurately place the sheet of paper on the belt/roller system. An example of this is in xerographic reproduction, where it is crucial to align the electrostatographic image properly within the area of a sheet of paper.

One way of accurately positioning the sheet on the belt/roller system is to first detect the position of the sheet gripper with an optical sensor device. The detection signal from the optical sensor is used in combination with a servo motor to properly time the movement of the sheet gripper. After a preset number of clock pulses, the sheet gripper will be in its proper position.

There are several drawbacks to such a system. First of all, the precision of the optical sensor degrades over time which can cause errors in detecting the sheet gripper. As dirt accumulates in the sheet transport system, the reflectivity of the sheet gripper changes which effects its detection by the optical sensor. Also, as the torque changes for the drive motor of the belt/roller system, the timing of the sheet gripper changes making it more difficult to precisely position the sheet gripper. One way of controlling these errors is the use of a highly accurate optical sensor, though such a sensor tends to be very expensive.

There is a need for a reliable sheet gripper positioning system that allows accurate positioning over time. There is also a need for a sheet gripper positioning system that does not add costs to the manufacturing of a sheet transport system. Finally, there is a need for a sheet gripper positioning system that does not require the use of a highly accurate and expensive optical sensor.

SUMMARY OF THE INVENTION

These needs are satisfied by the present invention. A reference signal, REG, is generated when a raster output scanner commences communicating data to a photoconductive surface. This REG signal is received by a master control board and sent to a registration control board which in turn starts the movement of a sheet gripper along a belt entrained around two rollers. An encoder coupled to the servo motor which drives one of the rollers generates a predetermined number of pulses for each full rotation of the motor's shaft. The encoder also includes an index marker which generates an index pulse for each full rotation of the shaft of the servo motor.

The index pulses and the encoder pulses are received by the registration control board. An index interrupt is generated by the registration control board after a predetermined number of index pulses are received. The registration control board computes the number of rising edges on the system clock that occur between the generation of the REG signal and the index interrupt and assigns this value to the variable LLI. This computed value is sent to the master control board which compares it to a predetermined resynchronization value. A discrepancy in the two values indicates to the master control board that the sheet gripper was improperly parked before the generation of the REG signal. The master control board computes a new park position value which compensates for the discrepancy. The new park position value is sent to the registration control board during a start-up phase which occurs before the next job is commenced. The park position value is equal to the number of encoder pulse signals received by the registration control board after the sheet gripper has passed a gripper home sensor. Thus, the park position error is computed during a first printing job in order to correct the gripper park position for the next print job.

BRIEF DESCRIPTION OF THE DRAWINGS

FIG. 3 is a block diagram showing the transfer of signals between the TRTL servo motor, master control board, and registration control board.

DETAILED DESCRIPTION

While the present invention will hereinafter be described in connection with a preferred method of use, it will be understood that it is not intended to limit the invention to that method of use. On the contrary, it is intended to cover all alternatives, modifications and equivalents as may be included within the spirit and scope of the invention as defined by the appended claims.

Figure 1:
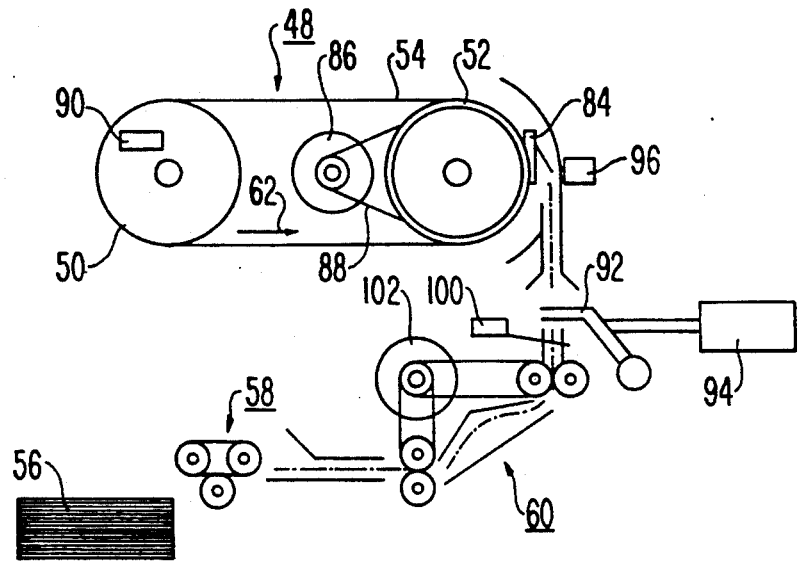
FIG. 1 is a schematic elevational view showing the details of a sheet gripper transport and sheet feeding system used in an electronic reprographic printing system.

A sheet transport system has a variety of applications, one of which is in an electrophotographic printing machine. A description of such a machine can be found in U.S. Pat. No. 4,986,526 to Dastin, the disclosure of which is incorporated herein by reference in its entirety. Referring to FIG. 1, a sheet gripper transport incorporating the present invention is shown. A gripper bar 84 is suspended between two timing belts 54 mounted on rollers 50 and 52. A servo motor 86 is coupled to roller 52 by a drive belt 88. In this embodiment, the servo motor 86 is part of a two roll transfer loop device (TRTL). There is a coarse position sensor 90, i.e. the gripper home sensor, which transmits coarse information as to the position of the gripper bar around the loop to a registration control board 1 (which is the servo controller) and a master control board 7 (see FIG. 3). The registration and master control boards 1, 7 are printed wiring board assemblies (PWBA). The registration control board 1 serves as a position controller to command the gripper bar to be positioned at a specific location at a specific time. The master control board 7 supplies a system clock and performs positioning computations for the registration control board. The master control board 7 also controls features of the TRTL 9 not relevant to the present invention. Sheet feeder 58 is a friction retard feeder with a servo controlled pre-transfer sheet transport 60 associated therewith. Sheet transport 60 can operate at two speeds, i.e. the printing machine process speed and twice the printing machine process speed. Sheet feeder 58 advances a sheet from stack 56 to transport 60. The sheet is pre-registered by a registration gate 92 advanced into and out of the sheet path by a solenoid 94. The sheet is fed into gripper bar 84 at twice the process speed for 200 milliseconds. The sheet de-skews into the gripper bar. Then servo motor 86 drives belts 54 at the process speed for the duration of the sheet length. A sensor 96 is positioned in the loading zone. Sensor 96 is used to set both the sheet and gripper bar timing to the load zone. Sensor 96 is an optical sensor which is a light emitting diode and a phototransistor. The sensor is triggered based on diffuse reflected light from the object that is to be measured. The sensor is positioned to detect both the gripper bar and the sheet separately when they arrive at the load zone. During normal operation of sheet transport 48, the sensor is also used to detect sheet jams, mis-grips, mis-releases, and sheets left on belts 54 before the start of the next job. A timing setup procedure, i.e. calibration of the registration of the sheet with the sheet grippers at the loading zone, is done in a special diagnostic routine that is executed upon initial machine assembly in the manufacturing plant or at a customer's facility, if replacement of the sheet transport or sheet feeder is required.

Figure 2:
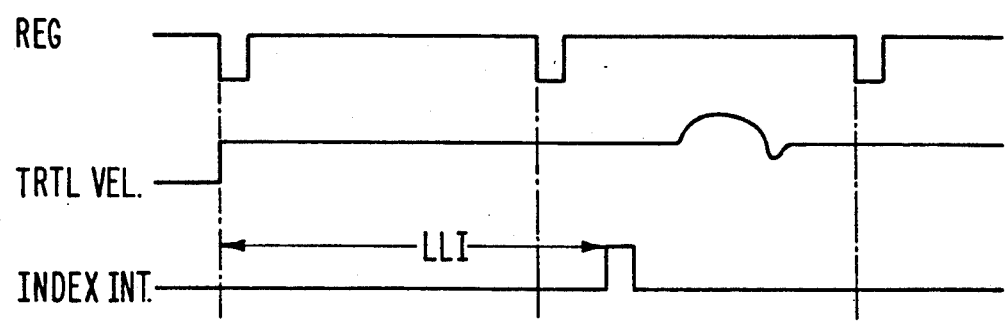
FIG. 2 is a timing diagram.

The timing diagram for the sheet gripper transport is shown in FIG. 2. The reference signal initiating registration, REG, transitions from high to low at the exact time when a raster output scanner device (not shown) has started to write or scan the information from an original document onto a photoconductive belt. The REG signal is received at the master control board 7 and sent to the registration control board 1 (See FIG. 3). The objective of the sheet transport is to register the sheet to the developed image on the photoconductive belt as accurately as possible to maintain accurate image to sheet and image to image registration.

Before the start of a print job, the gripper 84 is normally parked by waiting for a signal to be generated by the gripper home sensor 90 and counting, in the registration control board 1, a certain number of encoder clock signals (e.g., 6100 rising and falling edges of the encoder pulse signals) after the gripper home sensor signal goes low. In this embodiment, the sheet gripper moves at a speed of approximately 475 mm/sec past the gripper hone sensor and is parked. The number of encoder clock signals is referred to as the park position value which is sent from the master control board 7 to the registration control board 1 during this start-up phase.

When the REG signal is generated, the registration control board 1 causes the TRTL servo motor 86 to start moving the gripper 84 in the direction indicated by arrow 62. As can be seen in FIG. 2, the gripper 84 initially moves at a constant speed (e.g., 190.5 mm/sec). An encoder 3 (see FIG. 3), coupled to the back of the TRTL servo motor 86, generates a certain number of clock pulses for every revolution of the servo motor's shaft. The encoder 3 includes an index marker (see FIG. 3) which generates one index pulse signal for each revolution of the TRTL servo motor's shaft. The encoder pulses and index pulses are sent to the registration control board 1 from the encoder 3. After a certain number of index pulses are received by the registration control board 1 (e.g., 12), an index interrupt signal is generated.

The registration control board 1 computes the number of rising edges of the system clock from the master control board 7 that have occurred between the generation of the REG signal and the index interrupt. The number of rising edges is stored to the variable LLI (see FIG. 2). LLI is directly proportional to the distance traveled by the sheet gripper 84 once the REG signal is generated (i.e., from the park position). The LLI value is sent to the master control board 7. A previously determined resynchronization number, which is a constant equal to a known target value for the LLI, is compared to the resynchronization number in order to determine a park position error. This park position error is first compared to a predetermined tolerance value (e.g., 10 clock pulses) and is then used to recompute a new park position value. This new park position value is sent to the registration control board 1 during the next start up phase of the electrophotographic printing machine. In this embodiment, it is assumed that the encoder pulse frequency and system clock frequency are equal when the sheet gripper is moving at a velocity of 190.5 mm/sec. The park position value is equal to a number of rising and falling edges of the encoder pulse signals while the LLI and resynchronization values are equal to respective numbers of rising edges of the system clock. Therefore, the new park position value should be set to the old park position value minus two times the difference between the resynchronization number and LLI, or:

$$Park\ Pos_{NEW} = Park\ Pos_{OLD} - 2*(Resync - LLI).$$

As described above, the park position value is an encoder pulse count which is used to place the sheet gripper 84 in the appropriate park position before the start of a print job.

Using this method, the park position of the sheet gripper 84 can be updated at the start of all jobs. Since the registration control board, master control board, gripper home sensor, index marker, and encoder are all part of the system, no additional components are needed, thus avoiding increased costs.

What is claimed:

1. A sheet gripper position control system in an electronic reprographic printing system performing print jobs and including a raster output scanner which communicates data to a photoconductive surface, said control system comprising:

first and second rollers;

at least one belt entrained around said rollers;

a sheet gripper coupled to said belt;

a gripper home sensor coupled in close proximity to one of said rollers, said gripper home sensor detecting said sheet gripper at one location along said belt and generating a gripper home signal;

a servo motor having a shaft coupled to said first roller, said servo motor rotating said rollers and said belt around said rollers at selected velocities;

an encoder coupled to said servo motor, said encoder generating a first predetermined number of encoder pulse signals for every full rotation of the shaft of said servo motor;

said servo motor including an index marker, and generating an index pulse signal for every full rotation of the shaft of said servo motor;

a master control board coupled to said gripper home sensor and said servo motor, said master control board receiving a reference signal when a raster output scanner commences communicating data to a photoconductive surface, said master control board generating a system clock signal and a park position value;

a registration control board coupled to said master control board, said gripper home sensor, said servo motor, and said encoder, said registration control board receiving said encoder pulse signals and index pulse signals from said encoder, said gripper home signal from said gripper home sensor, and said reference signal, system clock signal, and park position value from said master control board, said registration control board generating an index interrupt after a predetermined number of index pulse signals are received from said encoder, said registration control board controlling the position of said sheet gripper in dependance of said park position value from said master control board, said registration control board computing a distance value equal to a number of system clock signals occurring between the generation of said reference signal and the generation of said index interrupt;

said master control board receiving said distance value from said registration control board and comparing said distance value to a predetermined resynchronization value and computing said park error value, said value being equal to the difference between said distance value and said resynchronization value.

2. The sheet gripper position control system of claim 1, wherein said master control board sends a new park position value to said registration control board only when said park error value exceeds a predetermined tolerance value, said new park position value being used to place said sheet gripper in a park position before commencement of a next print job.

3. The sheet gripper position control system of claim 1, wherein said park position value corresponds to a number of encoder pulses to be generated by said encoder after the generation of said gripper home signal.

4. A method of correcting sheet gripper positioning errors in an electronic reprographic printing system performing print jobs, comprising:

sending a park position value from a master control board to a registration control board before commencement of a print job;

detecting in a gripper home sensor the position of said sheet gripper;

generating a gripper home signal in said gripper home sensor once said sheet gripper has passed said gripper home sensor;

positioning said sheet gripper by said registration control board after said park position value elapses after the generation of said gripper home signal;

generating a reference signal in a master control board when a raster output scanner commences communicating data to a photoconductive surface;

moving a sheet gripper device along belts entrained around first and second rollers coupled to a servo motor in response to said reference signal;

generating in an index marker an index pulse for each full rotation of a shaft of said servo motor;

sending said index pulses to a registration control board;

generating in said registration control board a index interrupt after receipt of a predetermined number of index pulses;

computing a distance value in said registration board equal to a number of system clock pulses occurring between the generation of said reference signal and the generation of said index interrupt;

sending said distance value to said master control board;

computing in said master control board a park error value, said error value equal to the difference between said distance value and a predetermined resynchronization value; and recalculating said park position value.

5. The method of claim 4, wherein said recalculating step only occurs when said park error exceeds a predetermined tolerance value.

6. The method of claim 4, further comprising:

generating in said encoder a predetermined number of encoder pulse signals for each full rotation of the shaft of said servo motor; and sending said encoder signals to said registration control board, such that said park position value corresponds to the number of encoder pulse signals received by said registration control board.

7. A park position control apparatus in a sheet transport system, comprising:

a sheet gripper;

a driving apparatus having a shaft, said driving apparatus coupled to said sheet gripper and capable of moving said sheet gripper in a circuitous path;

an encoder coupled to said driving apparatus, said encoder generating a first predetermined number of encoder pulse signals for every full rotation of the shaft of said driving apparatus;

a reference signal generator coupled to said driving apparatus, said reference signal generator for producing a reference signal when said sheet gripper commences movement along said circuitous path;

a control means coupled to said encoder and reference signal generator, said control means having means for generating a system clock signal and for receiving said encoder pulse signals from said encoder, and said reference signal from said reference signal generator, said control means having means for computing a distance value equal to a number of system clock signals occurring between the generation of said reference signal and the generation of a second predetermined number of encoder pulse signals, said control means having means for comparing said distance value to a predetermined resynchronization value and computing a park error value, said park error value being equal to the difference between said distance value and said resynchronization value.

8. The apparatus of claim 7 wherein said control means being further coupled to said driving apparatus, said system further comprising:

a sensor disposed along said circuitous path, said sensor detecting said sheet gripper at one location along said circuitous path and generating a gripper home signal;

said control means being coupled to said sensor and controlling the position of said sheet gripper, such that said control means controls said driving apparatus and stops said sheet gripper in a park position a third number of encoder clock pulses after said control means receives said gripper home signal from said sensor;

said control means recomputing said third number of encoder clock pulses in dependence on said park error value.

9. The apparatus of claim 8 wherein said driving apparatus is a servo motor.

10. The apparatus of claim 8, wherein said control means is a control board.

11. The apparatus of claim 8, further comprising:
a first roller;
said driving apparatus coupled to said first roller for rotating said first roller at selected velocities and said sheet gripper being moved in close proximity to a surface of said first roller.

12. The apparatus of claim 11, further comprising:
a second roller; and
at least one belt entrained around said first and second rollers, such that said sheet gripper is coupled to said belt.

13. The apparatus of claim 8, wherein said park position control system is coupled within an electronic reprographic printing system performing print jobs and including a raster output scanner which communicates data to a photoconductive surface, such that said reference signal is generated when a raster output scanner commences communicating data to a photoconductive surface.

14. The apparatus of claim 8, wherein said control means comprises:
a master control board coupled to said sensor and said driving apparatus, said master control board having means for generating said system clock signals and said third number value; and
a registration control board coupled to said master control board, said sensor, said driving apparatus, and said encoder, said registration control board having means for receiving said encoder pulse signals from said encoder, said gripper home signal from said gripper home sensor, and said reference signal, system clock signal, and third number value from said master control board, said registration control board having means for computing said distance value;
said master control board having means for receiving said distance value from said registration control board and comparing said distance value to said resynchronization value and computing said park error value.

15. The apparatus of claim 14, wherein said master control board sends a new third number value to said registration control board only when said park error value exceeds a predetermined tolerance value.

16. A method of correcting sheet gripper positioning errors, comprising:
moving said sheet gripper device along a circuitous path with a driving apparatus;
generating a reference signal in a control means when said sheet gripper commences movement along said circuitous path;
generating in an encoder a first predetermined number of encoder clock pulses for every rotation of a shaft in said driving apparatus;
detecting in a sensor the position of said sheet gripper;
generating a gripper home signal in said sensor once said sheet gripper has passed said sensor;
positioning said sheet gripper by said control means a period of time after the generation of said gripper home signal;
computing in said control means a distance value equal to a number of system clock pulses occurring between the generation of said reference signal and the generation of a second predetermined number of encoder pulse signals;
computing in said control means a park error value, said error value equal to the difference between said distance value and a predetermined resynchronization value; and
recalculating said period time value in dependance on said park error value.

17. The method of claim 16, wherein said recalculating step only occurs when said park error exceeds a predetermined tolerance value.

18. The method of claim 16, wherein said period of time is equal to a third number of encoder pulse signals.

19. The method of claim 16, wherein in a reprographic printing system performing print jobs, said reference signal is generated when a raster output scanner commences communicating data to a photoconductive surface.

* * * * *